(12) United States Patent
Camacho et al.

(10) Patent No.: US 10,638,309 B1
(45) Date of Patent: Apr. 28, 2020

(54) SYSTEM AND METHOD TO ALTER A TELEMATICS UNIT PHONE NUMBER

(71) Applicant: GENERAL MOTORS LLC, Detroit, MI (US)

(72) Inventors: Esteban Camacho, Belleville, MI (US); Ali H. Fawaz, Dearborn Heights, MI (US); Ryan Olejniczak, Macomb, MI (US); Alexander X. Cermak, Grosse Pointe Woods, MI (US)

(73) Assignee: GENERAL MOTORS LLC, Detroit, MI (US)

( * ) Notice: Subject to any disclaimer, the term of this patent is extended or adjusted under 35 U.S.C. 154(b) by 0 days.

(21) Appl. No.: 16/531,905

(22) Filed: Aug. 5, 2019

(51) Int. Cl.
| | |
|---|---|
| H04W 4/20 | (2018.01) |
| H04W 4/18 | (2009.01) |
| H04W 4/48 | (2018.01) |
| H04M 3/42 | (2006.01) |
| H04M 3/436 | (2006.01) |
| H04B 3/23 | (2006.01) |
| H04W 8/26 | (2009.01) |
| H04L 29/12 | (2006.01) |
| H04W 4/40 | (2018.01) |

(52) U.S. Cl.
CPC ........... H04W 8/26 (2013.01); H04L 61/3005 (2013.01); H04L 61/605 (2013.01); H04W 4/40 (2018.02)

(58) Field of Classification Search
CPC ...... H04M 3/436; H04M 3/42; H04M 1/6075; H04B 7/853; H04B 1/3833; H04B 3/23; H04W 4/48; H04W 4/18; H04W 4/20; H04W 76/18

USPC ......... 379/201, 201.01; 455/411, 552.1, 405, 455/422.1, 418, 404.1, 450, 435.1; 370/310, 230.1, 311; 380/270
See application file for complete search history.

(56) References Cited

U.S. PATENT DOCUMENTS

| | | | |
|---|---|---|---|
| 6,850,497 B1 * | 2/2005 | Sigler | H04B 7/1853 370/310 |
| 7,242,966 B1 * | 7/2007 | Averkamp | H04B 1/3833 455/552.1 |
| 8,099,111 B2 * | 1/2012 | Yi | G08G 1/20 340/989 |
| 8,145,225 B2 * | 3/2012 | Madhavan | H04M 1/6075 455/450 |
| 8,254,404 B2 * | 8/2012 | Rabenko | H04B 3/23 370/230.1 |
| 8,320,914 B2 * | 11/2012 | Madhavan | H04W 76/18 455/435.1 |
| 8,417,212 B2 * | 4/2013 | Cepuran | H04W 76/50 455/404.1 |
| 8,509,773 B2 * | 8/2013 | Madhavan | H04W 48/20 455/404.1 |

(Continued)

Primary Examiner — William D Cumming

(57) ABSTRACT

A system to alter a phone number assigned to a telematics unit in which a server of a data center retrieves a phone call log that includes the call transmissions of a telematics unit made over a time period. Moreover, upon retrieval, the server will extract certain criteria from the phone call log, compile the extracted criteria, and then determine whether or not to alter the phone number based on the compiled criteria. When it is determined to do so, the server may alter the phone number by changing the phone number's area code or exchanging the phone number assigned to the telematics unit with another phone number.

20 Claims, 2 Drawing Sheets

(56) References Cited

U.S. PATENT DOCUMENTS

| | | | | |
|---|---|---|---|---|
| 8,682,307 B2* | 3/2014 | Oesterling | | H04W 4/18 |
| | | | | 455/418 |
| 8,781,442 B1* | 7/2014 | Link, II | | G08G 1/205 |
| | | | | 455/411 |
| 8,868,030 B2* | 10/2014 | Sumcad | | H04W 4/48 |
| | | | | 455/405 |
| 8,879,451 B2* | 11/2014 | Yi | | B60R 25/403 |
| | | | | 340/7.32 |
| 8,923,797 B2* | 12/2014 | Ball | | G07C 5/008 |
| | | | | 455/404.1 |
| 9,112,700 B2* | 8/2015 | Link, II | | G08G 1/205 |
| 9,253,630 B2 | 2/2016 | Tagg et al. | | |
| 9,538,338 B2* | 1/2017 | Das | | H04M 3/42 |
| 9,603,006 B2 | 3/2017 | Evans et al. | | |
| 10,027,805 B2* | 7/2018 | Husain | | H04M 3/5183 |
| 2008/0056474 A1* | 3/2008 | Wang | | H04M 3/436 |
| | | | | 379/201.01 |
| 2012/0264395 A1* | 10/2012 | Bradburn | | H04M 3/5233 |
| | | | | 455/404.1 |
| 2013/0016637 A1* | 1/2013 | Yi | | B60R 25/403 |
| | | | | 370/311 |
| 2013/0059575 A1* | 3/2013 | Oesterling | | H04W 4/18 |
| | | | | 455/422.1 |
| 2014/0031005 A1* | 1/2014 | Sumcad | | H04W 4/48 |
| | | | | 455/405 |
| 2014/0294180 A1* | 10/2014 | Link, II | | G08G 1/205 |
| | | | | 380/270 |

* cited by examiner

SYSTEM AND METHOD TO ALTER A TELEMATICS UNIT PHONE NUMBER

INTRODUCTION

Car companies pay different amounts to wireless carriers based on the terms of their subscription agreements. Moreover, these companies generally subscribe to the services of multiple wireless carriers based on the geographic areas serviced by each provider. For example, a car company may subscribe to the services of one wireless carrier covering New York and a completely different wireless carrier covering Michigan. To accommodate this arrangement, a car company will designate a primary area for a vehicle based on feedback from the vehicle owner. The company will also assign a phone number provisioned by the wireless carrier corresponding to that vehicle's designated area. An area code associated with the designated area will also be incorporated into the assigned phone number. Furthermore, this arrangement can be beneficial to both the vehicle owner and respective car company. As follows, it can be beneficial to the vehicle owner because they will receive optimal cellular service performance while using their telematics unit to make phone calls within their designated area. It can be beneficial to the car company because the company will be paying the agreed upon subscription price for such calls and not the exorbitant costs that come with roaming fees.

It is only after the vehicle has been traveling outside of the boundaries of its designated area for a substantial amount of time that this arrangement becomes burdensome to the vehicle owner and car company. While the vehicle is outside these geographic bounds, the vehicle owner will receive suboptimal cellular services and the car company will pay exorbitant roaming fees. With that in mind, unfortunately, the car company will not know to change the vehicle's phone number until after being notified by its owner. And the company may not be notified of this change for a very long time after the vehicle has left its designated area (e.g., when the owner forgets to alert the car company they have moved to another state or country). Accordingly, it is desirable for the car company to proactively change a vehicle's assigned phone number or area code (or both). To achieve this effect, it is further desirable for the company to monitor various criteria within the vehicle's call history so as to determine such a change is needed. Moreover, other desirable features and characteristics of the present invention will become apparent from the subsequent detailed description of the invention and the appended claims, taken in conjunction with the accompanying drawings and this background of the invention.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method to alter a phone number assigned to a telematics unit of a vehicle, the method including: retrieving, via a processor, phone call data that corresponds to a time period, where the phone call data is associated with a plurality of calls made by the telematics unit of the vehicle via a wireless carrier system; and based on the phone call data, via the processor, altering the phone number assigned to the telematics unit. Other embodiments of this aspect include corresponding computer systems, apparatus, and computer programs recorded on one or more computer storage devices, each configured to perform the actions of the methods.

Implementations may include one or more of the following features. The method further including: extracting, via the processor, criteria from the phone call data; providing, via the processor, the criteria to a lookup table; and where an output of the lookup table is used to determine whether the phone number is to be altered. The method where the criteria includes: area code utilization information, signal strength information, number of calls made information, call length information, roaming time information, call type information, wireless carrier cost information, and coverage information. The method further including: extracting, via the processor, criteria from the phone call data; providing, via the processor, the criteria as an input to a decision tree; and where an output of the decision tree is used to determine whether the phone number is to be altered. The method where the criteria includes: area code utilization information, signal strength information, number of calls made information, call length information, roaming time information, call type information, wireless carrier cost information, and coverage information. The method where the time period is sixty (60) days. The method where altering the phone number is defined as updating an area code incorporated into the phone number. The method where altering the phone number is defined as exchanging a first phone number provisioned by a first wireless carrier with a second phone number provisioned by a second wireless carrier. Implementations of the described techniques may include hardware, a method or process, or computer software on a computer-accessible medium.

One general aspect includes a system to alter a phone number assigned to a telematics unit of a vehicle, the system including: a memory configured to include one or more executable instructions and a processor configured to execute the executable instructions, where the executable instructions enable the processor to carry out the following steps: retrieving phone call data that corresponds to a time period, where the phone call data is associated with a plurality of calls made by the telematics unit of the vehicle via a wireless carrier system; and based on the phone call data altering the phone number assigned to the telematics unit. Other embodiments of this aspect include corresponding computer systems, apparatus, and computer programs recorded on one or more computer storage devices, each configured to perform the actions of the methods.

Implementations may include one or more of the following features. The system further including: extracting criteria from the phone call data; providing the criteria to a lookup table; and where an output of the lookup table is used to determine whether the phone number is to be altered. The system where the criteria includes: area code utilization information, signal strength information, number of calls made information, call length information, roaming time information, call type information, wireless carrier cost information, and coverage information. The system further including: extracting criteria from the phone call data; providing the criteria as an input to a decision tree; and where an output of the decision tree is used to determine whether the phone number is to be altered. The system where the criteria includes: area code utilization information, signal strength information, number of calls made information, call length information, roaming time information, call type information, wireless carrier cost information, and coverage information. The system where the time period is sixty (60) days. The system where altering the phone number is defined as updating an area code incorporated into the phone number. The system where altering the phone number is defined as exchanging a first phone number provisioned by a first wireless carrier with a second phone number provisioned by a second wireless carrier. Implementations of the described techniques may include hardware, a method or process, or computer software on a computer-accessible medium.

One general aspect includes a non-transitory and machine-readable medium having stored thereon executable instructions adapted to alter a phone number assigned to a telematics unit of a vehicle, which when provided to a processor and executed thereby, causes the processor to carry out the following steps: retrieving phone call data that corresponds to a time period, where the phone call data is associated with a plurality of calls made by the telematics unit of the vehicle via a wireless carrier system; and based on the phone call data altering the phone number assigned to the telematics unit. Other embodiments of this aspect include corresponding computer systems, apparatus, and computer programs recorded on one or more computer storage devices, each configured to perform the actions of the methods.

Implementations may include one or more of the following features. The non-transitory and machine-readable memory where the time period is sixty (60) days. The non-transitory and machine-readable memory where altering the phone number is defined as updating an area code incorporated into the phone number. The non-transitory and machine-readable memory where altering the phone number is defined as exchanging a first phone number provisioned by a first wireless carrier with a second phone number provisioned by a second wireless carrier. Implementations of the described techniques may include hardware, a method or process, or computer software on a computer-accessible medium.

The above features and advantages and other features and advantages of the present teachings are readily apparent from the following detailed description for carrying out the teachings when taken in connection with the accompanying drawings.

BRIEF DESCRIPTION OF THE DRAWINGS

The disclosed examples will hereinafter be described in conjunction with the following drawing figures, wherein like numerals denote like elements, and wherein.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present system and/or method. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
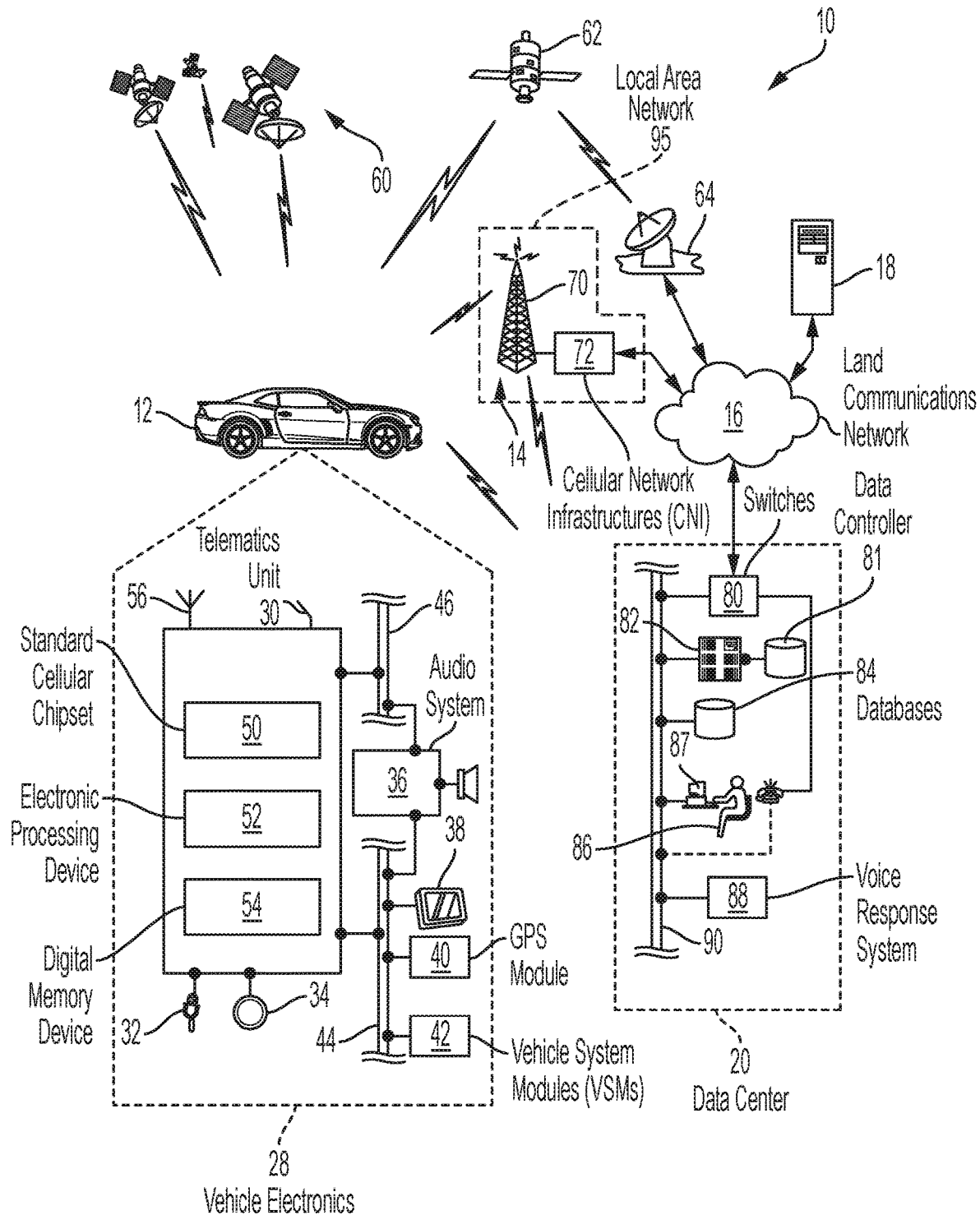
FIG. 1 is a block diagram depicting an exemplary embodiment of a communications system that is capable of utilizing the system and method disclosed herein.

With reference to FIG. 1, there is shown an operating environment that includes, among other features, a mobile vehicle communications system 10 and that can be used to implement the method disclosed herein. Communications system 10 generally includes a vehicle 12, one or more wireless carrier systems 14 under the control of a mobile network operator (MNO) 95, a land communications network 16, a computer 18, and a data center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including, but not limited to, motorcycles, trucks, busses, sports utility vehicles (SUVs), recreational vehicles (RVs), construction vehicles (e.g., bulldozers), trains, trolleys, marine vessels (e.g., boats), aircraft, helicopters, amusement park vehicles, farm equipment, golf carts, trams, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit 30 such as, for example, the microphone 32 and pushbutton(s) 34, whereas others are indirectly connected using one or more network connections, such as a communications bus 44 or an entertainment bus 46. Examples of suitable network connections include a controller area network (CAN), WIFI, BLUETOOTH and BLUETOOTH Low Energy (BLE) wireless protocols, a media-oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket transceiver device that is installed in the vehicle and that enables wireless voice and/or data communication over wireless carrier system 14 and via wireless networking. This enables the vehicle to communicate with data center 20, other telematics-enabled vehicles, or some other entity or device. The telematics unit 30 preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor 86 or voice response unit at the data center 20) and data communication (e.g., to provide GPS location data or vehicle diagnostic data to the data center 20), the system can utilize a single call over a voice channel and switch as needed between voice and data transmission over the voice channel, and this can be done using techniques known to those skilled in the art.

MNO 95 (otherwise known as a "wireless service provider", "wireless carrier", or "cellular provider"), is a provider of wireless communications services that owns or otherwise controls wireless carrier system 14. Moreover, MNO 95 sells and delivers wireless services to data center 20, who can then enable telematics communications services at telematics unit 30 in accordance with an agreed upon subscription. As follows, MNO 95 can control multiple cell towers of wireless carrier system 14, as arranged within some kind of defined parameter, for example, within a geographic boundary. In particular, telematics unit 30 may use the cellular towers of a primary MNO 95 while at a first location and then the cellular towers of a secondary MNO 95' while at a second location. As a result, telematics unit 30 would be roaming at the second location and while under the purview of the secondary MNO 95'. Furthermore, these independent MNOs 95 may have their own independent services agreements, each having their own terms, with data center 20.

According to one embodiment, telematics unit 30 utilizes cellular communication according to standards such as LTE or 5G and thus includes a standard cellular chipset 50 for voice communications like hands-free calling, a wireless modem for data transmission (i.e., transceiver), an electronic processing device 52, at least one digital memory device 54, and an antenna system 56. It should be appreciated that the modem can either be implemented through software that is stored in the telematics unit and is executed by processor 52, or it can be a separate hardware component located internal or external to telematics unit 30. The modem can operate using any number of different standards or protocols such as, but not limited to, WCDMA, LTE, and 5G. Wireless networking between vehicle 12 and other networked devices can also be carried out using telematics unit 30. For this purpose, telematics unit 30 can be configured to communicate wirelessly according to one or more wireless protocols, such as any of the IEEE 802.11 protocols, WiMAX, or BLUETOOTH. When used for packet-switched data communication such as TCP/IP, the telematics unit can be configured with a static IP address or can set up to automatically receive an assigned IP address from another device on the network such as a router or from a network address server.

Telematics Controller 52 (processor) can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Telematics Controller 52 executes various types of digitally-stored instructions, such as software or firmware programs stored in memory 54, which enable the telematics unit to provide a wide variety of services. For instance, controller 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services provided in connection with one or more vehicle system modules 42 (VSM); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30 but are simply an enumeration of some of the services that the telematics unit 30 is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to data center 20 or other remote computer system, such as computer 18, for other purposes, such as fleet management. Also, new or updated map data can be downloaded to the GPS module 40 from the data center 20 via the telematics unit 30.

Apart from the audio system 36 and GPS module 40, the vehicle 12 can include other VSMs 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests.

As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art.

The pushbutton(s) 34 allow manual user input into the telematics unit 30 to initiate wireless telephone calls and provide other data, response, or control input. Separate pushbuttons can be used for initiating emergency calls versus regular service assistance calls to the data center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM, media streaming services (e.g., PANDORA RADIO™, SPOTIFY™, etc.), satellite radio, CD, DVD, and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions (i.e., capable of GUI implementation). Audio system 36 may also generate at least one audio notification to announce such third-party contact information is being exhibited on display 38 and/or may generate an audio notification which independently announces the third-party contact information. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more cellular network infrastructures (CNI) 72, as well as any other networking components required to connect wireless carrier system 14 with land network 16. Each cell tower 70 includes sending and receiving antennas and a base station, with the base stations from different cell towers being connected to the CNI 72 either directly or via intermediary equipment such as a base station controller. Cellular system 14 can implement any suitable communications technology, including for example, analog technologies such as AMPS, or the newer digital technologies such as, but not limited to, 4G LTE and 5G. As will be appreciated by skilled artisans, various cell tower/base station/CNI arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to data center 20. For example, land network 16 may include a public switched telephone network (PSTN) such as that used to provide hardwired telephony, packet-switched data communications, and the Internet infrastructure (i.e., a network of interconnected computing device nodes). One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, data center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer (e.g., a SIP Presence server) where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or data center 20, or both. A computer 18 can also be used for providing Internet connectivity such as DNS services or as a network address server that uses DHCP or other suitable protocol to assign an IP address to the vehicle 12.

Data center 20 is designed to provide the vehicle electronics 28 with a number of different system backend functions and, according to the exemplary embodiment shown here, generally includes one or more switches 80, servers 82, databases 84, live advisors 86, as well as an automated voice response system (VRS) 88, all of which are known in the art. These various data center components are preferably coupled to one another via a wired or wireless local area network 90. Switch 80, which can be a private branch exchange (PBX) switch, routes incoming signals so that voice transmissions are usually sent to either the live advisor 86 by regular phone, backend computer 87, or to the automated voice response system 88 using VoIP. Server 82 can incorporate a data controller 81 which essentially controls the operations of server 82. Server 82 may control data information as well as act as a transceiver to send and/or receive the data information (i.e., data transmissions) from one or more of the databases 84, telematics unit 30, and mobile computing device 57.

Controller 81 is capable of reading executable instructions stored in a non-transitory machine readable medium and may include one or more from among a processor, a microprocessor, a central processing unit (CPU), a graphics processor, Application Specific Integrated Circuits (ASICs), Field-Programmable Gate Arrays (FPGAs), state machines, and a combination of hardware, software and firmware components. The live advisor phone can also use VoIP as indicated by the broken line in FIG. 1. VoIP and other data communication through the switch 80 are implemented via a modem (i.e., a transceiver), connected between the land communications network 16 and local area network 90.

Data transmissions are passed via the modem to server 82 and/or database 84. Database 84 can store account information such as vehicle dynamics information and other pertinent subscriber information. Data transmissions may also be conducted by wireless systems, such as 802.11x, GPRS, and the like. Although the illustrated embodiment has been described as it would be used in conjunction with a manned data center 20 using live advisor 86, it will be appreciated that the data center can instead utilize VRS 88 as an automated advisor or, a combination of VRS 88 and the live advisor 86 can be used.

Method

Figure 2:
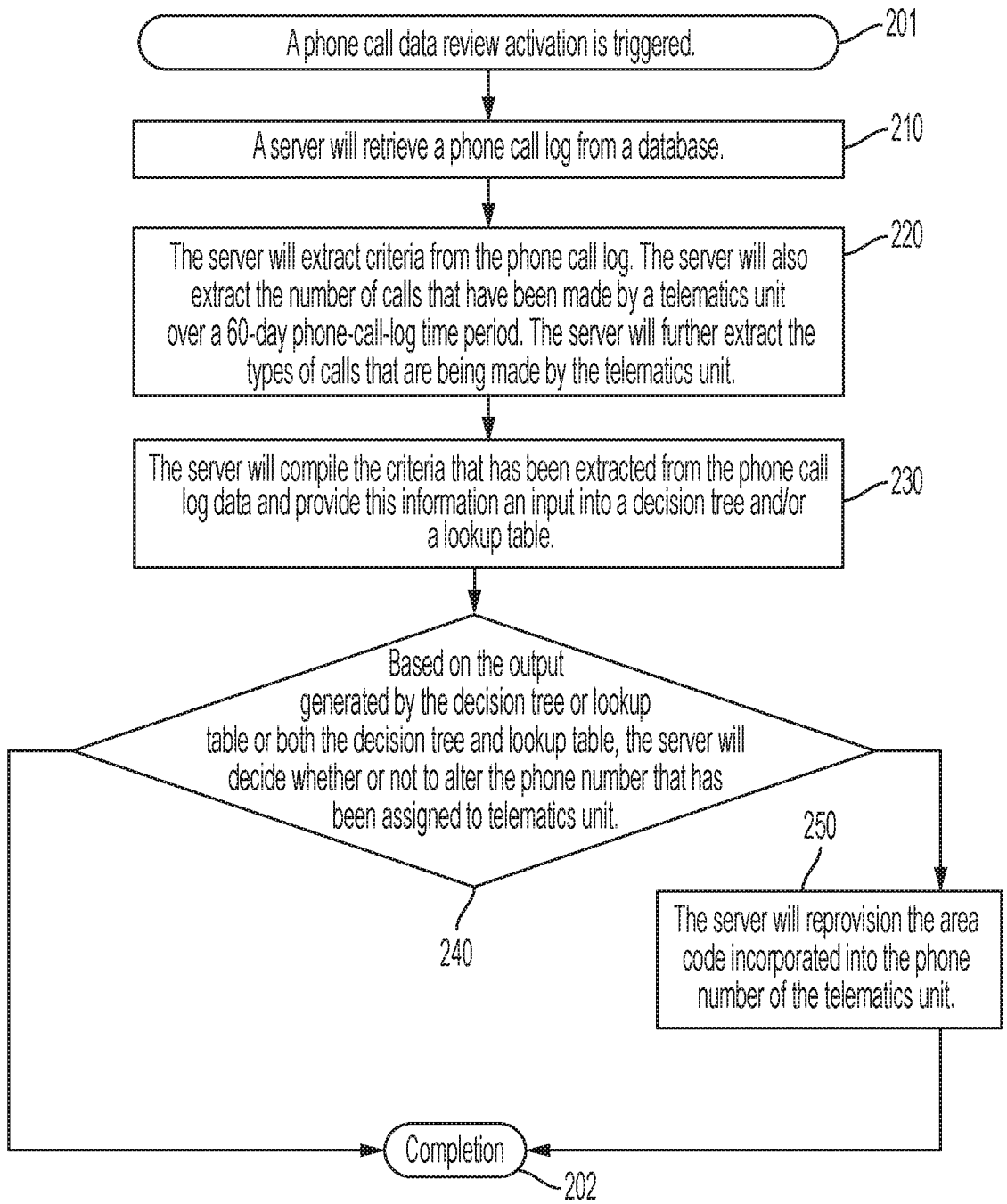
FIG. 2 is a flow chart for an exemplary methodology to alter a telematics phone number according to one aspect of the system and method presented herein.

Turning now to FIG. 2, there is shown an embodiment of a method 200 to alter a phone number that has been assigned to telematics unit 30 based on multiple criteria found in the call records for the phone number. Method 200 or parts thereof can be implemented in a computer program product (e.g., processor 52) embodied in a computer readable medium and including instructions usable by one or more processors of one or more computers of one or more systems to cause the system(s) to implement one or more of the method steps. The computer program product may include one or more software programs comprised of program instructions in source code, object code, executable code, or other formats; one or more firmware programs; or hardware description language (HDL) files; and any program related data. The data may include data structures, look-up tables, or data in any other suitable format. The program instructions may include program modules, routines, programs, objects, components, and/or the like. The computer program can be executed on one computer or on multiple computers in communication with one another.

The program(s) can be embodied on computer readable media, which can be non-transitory and can include one or more storage devices, articles of manufacture, or the like. Exemplary computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium may also include computer to computer connections, for example, when data is transferred or provided over a network or another communications connection (either wired, wireless, or a combination thereof). Any combination(s) of the above examples is also included within the scope of the computer-readable media. It is therefore to be understood that the method can be at least partially performed by any electronic articles and/or devices capable of carrying out instructions corresponding to one or more steps of the disclosed method.

One or more aspects of phone number alteration method 200 may be completed through data center 20 which may include one or more executable instructions incorporated into databases 84 (memory) and carried out by server 82 (processor). Skilled artisans will moreover see that telematics unit 30 and data center 20 may be remotely located from each other. Method 200 is supported by telematics unit 30 being configured to establish one or more communication protocols with data center 20 and other remote entities via wireless carrier system 14. This configuration may be established by a vehicle manufacturer at or around the time of the telematics unit's assembly or after-market (e.g., via vehicle download using the afore-described communication system 10 or at a time of vehicle service, just to name a couple of examples). In at least one implementation, one or more instructions are provided to server 82 and stored on non-transitory computer-readable medium (e.g., database 84). In at least one implementation, one or more instructions are provided to the telematics unit 30 and stored on non-transitory computer-readable medium (e.g., digital memory device 54).

Method 200 begins at 201 in which a phone call data review activation is triggered. Upon such a trigger occurring, server 82 will know to begin the steps of method 200 (discussed below). In one or more embodiments, the trigger may occur after some preset amount of time (i.e., at the end of a timer sequence). For example, the trigger may go off every sixty (60) days. In step 210, server 82 will retrieve a phone call log from database 84. This phone call log includes data associated with all call transmissions made by telematics unit 30 over wireless carrier system 14. The data may also cover the call transmissions made over the sixty (60) days prior to the log being retrieved from database 84.

In step 220, server 82 will extract criteria from the phone call log data. For example, server 82 can extract the signal strengths for each of the call transmissions that have been made over the phone call log time period. Server 82 may also average the values of these signal strengths for the purposes of understanding how often telematics unit 30 was roaming when phone calls were made. As follows, if the average signal strength for the calls is above a −100 decibel milliwatts (dbm) threshold value, then this is an indication that more than half of the calls made were not roaming. However, if this average signal strength is below the −100 dbm threshold, then this is an indication that a majority of the calls made were while telematics unit 30 was considered roaming. As discussed above, roaming occurs when telematics unit 30 accesses the wireless carrier system 14 of an MNO 95 in which the telematics unit 30 does not have a services agreement (subscription). In addition, server 82 can extract the area codes of the locations in which each of the phone calls were made. Server 82 may also tally each of these extracted area codes to determine which area code has the highest instance of call transmissions placed within its confines. As such, one area code may be shown through as the primary area code in which telematics unit 30 places its calls. This can also be understood as an indication as to whether telematics unit 30 is placing calls within the wireless carrier system 14 of the MNO 95 in which it has a services agreement.

Server 82 can also extract the number of calls that have been made by telematics unit 30 over the 60-day phone-call-log time period. In addition, server 82 can extract the length of time for each call. Moreover, server 82 may calculate the average length of time for these phone call transmissions. The longer the phone calls take place, the more a need there would be to ensure the call transmissions are not roaming while being conducted. Further yet, server 82 can extract the total amount of roaming time that occurred over the phone call log time period.

Server 82 can further extract the types of calls that are being made by telematics unit 30. For instance, server 82 can pull information that discloses whether a call was made as a Short Message Service (SMS) message, a data call (VOIP), vehicle trigger call, or a voice call. Moreover, server 82 may also tally each of these call transmission types so as to determine which call type has the highest instance of phone calls being placed. As such, if a majority of the phone calls are made as an SMS or VOIP, then this is an indication that telematics unit 30 has not been roaming a majority of the time. Server 82 can also extract the carrier roaming costs for the MNOs 95 that are recognized within the phone call log data. Server 82 may also retrieve this information from database 84 if the information is not found in the phone call log data itself. Further yet, server 82 may extract the coverage for each of the phone calls disclosed in the phone call log. This will help determine the lack of coverage at the locations in which telematics unit 30 is making the phone calls. As can be understood, a blocked call is an indication that coverage at a certain area is poor.

In step 230, server 82 will compile the criteria that has been extracted from the phone call log data and provide this information an input into a decision tree. The decision tree is a tool commonly used to arrive at a logical output. In one or more alternative embodiments, the compiled criteria are provided to a lookup table. As such, the criteria are provided to the look up table to be provided with an output. In one or more alternative embodiments, the output of the decision tree (discussed above) may be provided as an input to the lookup table (discussed above). The output from the decision tree and lookup table can be in binary type form. For instance, an output of "0" can indicate that the telematic unit's 30 assigned phone number remains the same. Alternatively, an output of "1" can indicate that the telematic unit's 30 assigned phone number be altered to avoid the telematics unit 30 from roaming a majority of the time. These outputs could also be provided in a scale format type; for example, having a value of one (1) to ten (10).

In step 240, based on the output generated by the decision tree or lookup table or both, server 82 will decide whether or not to alter the phone number that has been assigned to telematics unit 30. As discussed above, this phone number has been provisioned by the MNO 95 in which telematics unit 30 has a services agreement. As such, when it is determined that telematic unit 30 has been roaming a majority of the time, or above some other threshold amount of time (e.g., an output of "1", an output of more than 5", etc.), method 200 will move to step 250. Otherwise, when it is determined that telematics unit 30 does not roam a majority of the time, or below some other threshold amount of time (e.g., an output of "0", an output of less than 5", etc.), method 200 will move to completion 202.

In step 250, in one or more embodiments, server 82 will reprovision the area code incorporated into the phone number of the telematics unit 30. Server 82 may also update the area code to the area code extracted from the phone call log having the highest deemed tally. However, in some instances, it will make more sense for server 82 to change the services agreement associated with telematics unit 30 such that telematics unit 30 uses the wireless carrier system 14 of a new primary MNO 95. In these instances, server 82 will exchange the phone number that has been assigned to telematics unit 30 and provisioned by the first MNO 95 with a new, second phone number that is provisioned by a new MNO 95. This new phone number will also likely include a new area code but may not necessarily. After step 250, method 200 will move to completion 202.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the system and/or method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below", or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

None of the elements recited in the claims are intended to be a means-plus-function element within the meaning of 35 U.S.C. § 112(f) unless an element is expressly recited using the phrase "means for," or in the case of a method claim using the phrases "operation for" or "step for" in the claim.

What is claimed is:

1. A method to alter a phone number assigned to a telematics unit of a vehicle, the method comprising:
   retrieving, via a processor, phone call data that corresponds to a time period, wherein the phone call data is associated with a plurality of calls made by the telematics unit of the vehicle via a wireless carrier system; and
   based on the phone call data, via the processor, altering the phone number assigned to the telematics unit.

2. The method of claim 1, further comprising:
   extracting, via the processor, criteria from the phone call data;
   providing, via the processor, the criteria to a lookup table; and
   wherein an output of the lookup table is used to determine whether the phone number is to be altered.

3. The method of claim 2, wherein the criteria comprises: area code utilization information, signal strength information, number of calls made information, call length information, roaming time information, call type information, wireless carrier cost information, or coverage information, or some combination thereof.

4. The method of claim 1, further comprising:
   extracting, via the processor, criteria from the phone call data;
   providing, via the processor, the criteria as an input to a decision tree; and
   wherein an output of the decision tree is used to determine whether the phone number is to be altered.

5. The method of claim 4, wherein the criteria comprises: area code utilization information, signal strength information, number of calls made information, call length information, roaming time information, call type information, wireless carrier cost information, or coverage information, or some combination thereof.

6. The method of claim 1, wherein the time period is sixty (60) days.

7. The method of claim 1, wherein altering the phone number is defined as updating an area code incorporated into the phone number.

8. The method of claim 1, wherein altering the phone number is defined as exchanging a first phone number provisioned by a first wireless carrier with a second phone number provisioned by a second wireless carrier.

9. A system to alter a phone number assigned to a telematics unit of a vehicle, the system comprising:
   a memory configured to comprise one or more executable instructions and a processor configured to execute the executable instructions, wherein the executable instructions enable the processor to carry out the following steps:
   retrieving phone call data that corresponds to a time period, wherein the phone call data is associated with a plurality of calls made by the telematics unit of the vehicle via a wireless carrier system; and
   based on the phone call data, altering the phone number assigned to the telematics unit.

10. The system of claim 9, further comprising:
    extracting criteria from the phone call data;
    providing the criteria to a lookup table; and
    wherein an output of the lookup table is used to determine whether the phone number is to be altered.

11. The system of claim 10, wherein the criteria comprises: area code utilization information, signal strength information, number of calls made information, call length information, roaming time information, call type information, wireless carrier cost information, or coverage information, or some combination thereof.

12. The system of claim 9, further comprising:
    extracting criteria from the phone call data;
    providing the criteria as an input to a decision tree; and
    wherein an output of the decision tree is used to determine whether the phone number is to be altered.

13. The system of claim 12, wherein the criteria comprises: area code utilization information, signal strength information, number of calls made information, call length information, roaming time information, call type information, wireless carrier cost information, or coverage information, or some combination thereof.

14. The system of claim 9, wherein the time period is sixty (60) days.

15. The system of claim 9, wherein altering the phone number is defined as updating an area code incorporated into the phone number.

16. The system of claim 9, wherein altering the phone number is defined as exchanging a first phone number provisioned by a first wireless carrier with a second phone number provisioned by a second wireless carrier.

17. A non-transitory and machine-readable medium having stored thereon executable instructions adapted to alter a phone number assigned to a telematics unit of a vehicle, which when provided to a processor and executed thereby, causes the processor to carry out the following steps:
    retrieving phone call data that corresponds to a time period, wherein the phone call data is associated with a plurality of calls made by the telematics unit of the vehicle via a wireless carrier system; and
    based on the phone call data, altering the phone number assigned to the telematics unit.

18. The non-transitory and machine-readable memory of claim 17, wherein the time period is sixty (60) days.

19. The non-transitory and machine-readable memory of claim 17, wherein altering the phone number is defined as updating an area code incorporated into the phone number.

20. The non-transitory and machine-readable memory of claim 17, wherein altering the phone number is defined as exchanging a first phone number provisioned by a first wireless carrier with a second phone number provisioned by a second wireless carrier.

* * * * *